(No Model.)
M. L. SENDERLING.
DUMPING WAGON.
No. 505,236. Patented Sept. 19, 1893.
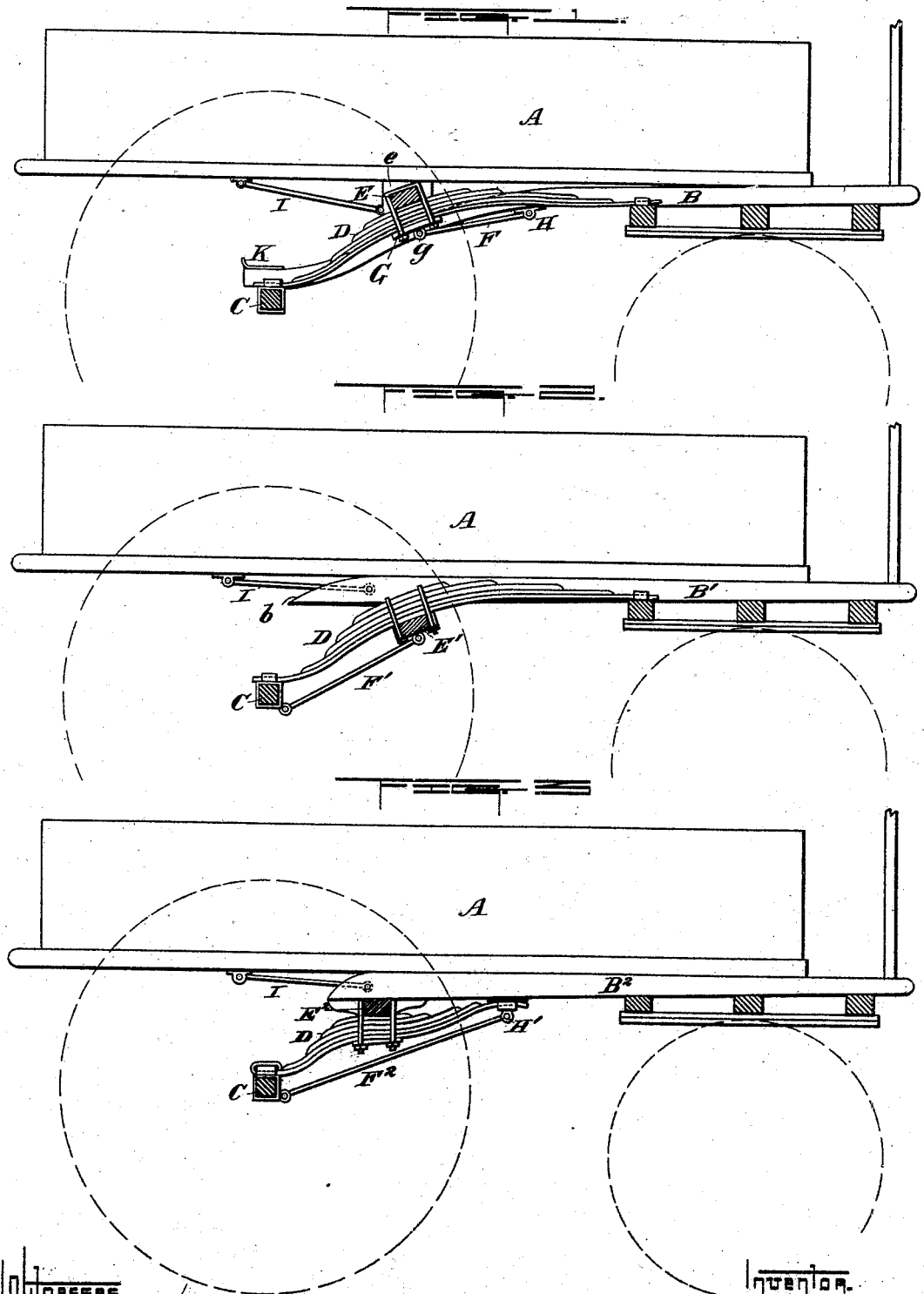

UNITED STATES PATENT OFFICE.

MARTIN L. SENDERLING, OF JERSEY CITY, NEW JERSEY.

DUMPING-WAGON.

SPECIFICATION forming part of Letters Patent No. 505,236, dated September 19, 1893.

Application filed December 29, 1892. Serial No. 456,684. (No model.)

*To all whom it may concern:*

Be it known that I, MARTIN L. SENDERLING, of Jersey City, in the county of Hudson and State of New Jersey, have invented a new and useful Improvement in Dump-Wagons, of which the following is a specification.

My invention relates to an improvement in dump wagons in which the body is supported and permitted to tilt on springs, the point of support and primary tilting point being forward of the rear axle.

A practical embodiment of my invention is represented in the accompanying drawings in which—

Figure 1 is a view of a portion of a dump wagon in side elevation, partly in section, showing the cross bar on which the body tilts fixed to the upper sides of the springs, the side rails of the supporting frame extending to the rear axle. Fig. 2 is a similar view, showing the body resting on the side rails and the latter on a cross bar fixed to the under sides of the springs, and Fig. 3 is a similar view, showing the body resting on the side rails and the latter upon a cross bar fixed to the upper side of the springs.

A represents the wagon body.

The side rails are denoted in Fig. 1 by B, in Fig. 2 by B' and in Fig. 3 by B². In each instance the side rails are secured to the head frame at the front, and in the form shown in Fig. 1, the side rails B, as they extend rearwardly, bend downwardly and are fixed to the rear axle C.

The springs for supporting the greater portion of the load are denoted by D. In the form shown in Figs. 1 and 2, the springs rest with their rear ends upon the rear axle and their forward ends on the rear portion of the head frame, their connection with the axle and frame being such as to permit them to play freely in the direction of the length.

The cross bar E in Fig. 1 is clipped to the upper sides of the springs and is so twisted, if iron, or so fitted, if wood, as to form a level rest $e$ for the body; while its ends conform to the slant of the springs. Links F are connected at one end to eyes $g$ in yoke pieces G on the under side of the spring, and at their opposite ends to eye pieces H, fixed to the side rails B. The links F serve to hold the springs in the desired longitudinal adjustment on the supporting frame since the rails B are fixed to the rear axle and head frame. Links I connect the wagon body with the cross bar E to direct it toward and hold it on its second fulcrum K during its tilting movement.

In the form shown in Fig. 2, the side rails B' rest on the cross bar E' which is clipped to the under side of the springs, and the body A rests and tilts on the side rails, their rear ends $b$ being rounded to afford it a varying fulcrum as it tilts. Links F' connect the cross bar E' with the rear axle and serve to hold the springs in proper longitudinal adjustment.

In the form shown in Fig. 3, the cross bar E² is clipped to the upper sides of the springs and the side rails B² rest on the cross bar, the body A resting and tilting on the side bars. In this form the rear ends of the springs are fixed to the rear axle and their forward ends are secured to the under sides of the rails B² so as to play freely in a longitudinal direction. An eye piece H' is conveniently provided with a socket for receiving the forward end of the spring and said eye pieces are connected with the rear axle by links F².

The three forms described above have the following features in common: The supporting springs have their rear ends engaged with the rear axle and their forward ends are supported upon the body supporting frame. The wagon bed rests at or near its central portion upon the central portions of the springs. The springs are held in the desired longitudinal adjustment by links which engage a part rigid with the springs and another part rigid with the supporting frame, and the springs are free at one or both ends to play freely in the direction of their length under the pressure of the load.

What I claim is—

1. In combination, a wagon body, a supporting axle, a supporting frame, springs engaged at their rear ends with the axle and at their forward ends with the frame, and means for supporting the body in tilting adjustment on the springs intermediate of their ends, substantially as set forth.

2. In combination, a wagon body, a supporting axle, a supporting frame including side rails as a part thereof, springs engaged at their rear ends with the axle and at their forward ends with the supporting frame and a cross bar fixed to the springs intermediate of their ends, the cross bar serving to transmit the weight of the wagon body and its load to the springs, substantially as set forth.

3. In combination, a wagon body, a supporting axle, a supporting frame, springs engaged at their rear ends with the axle and having a loose engagement at their forward ends with the supporting frame, and means for supporting the wagon body and its load upon the springs intermediate of their ends, substantially as set forth.

4. In combination, the wagon body, the supporting frame, the axle, springs engaged at one end with the axle and at the opposite end with the supporting frame, means for supporting the body and its load upon the springs intermediate of their ends and links fixed at one end relatively to the springs and at their opposite ends fixed relatively to the axle, substantially as set forth.

5. In combination, the tilting body, the axle, side rails extending from the axle forwardly to a head frame, springs loosely engaged at their rear ends with the axle and at their forward ends with the head frame, links connecting the springs with the side rails, and a cross bar fixed to the springs and forming a support for the tilting body, substantially as set forth.

MARTIN L. SENDERLING.

Witnesses:
FREDK. HAYNES,
GEORGE BARRY.